United States Patent
El Qacemi et al.

(10) Patent No.: US 11,930,816 B2
(45) Date of Patent: Mar. 19, 2024

(54) METHODS OF PEST CONTROL IN SOYBEAN

(71) Applicant: Syngenta Participations AG, Basel (CH)

(72) Inventors: Myriem El Qacemi, Stein (CH); Jerome Yves Cassayre, Stein (CH)

(73) Assignee: SYNGENTA PARTICIPATIONS AG, Basel (CH)

( * ) Notice: Subject to any disclaimer, the term of this patent is extended or adjusted under 35 U.S.C. 154(b) by 58 days.

(21) Appl. No.: 14/419,074

(22) PCT Filed: Jul. 26, 2013

(86) PCT No.: PCT/EP2013/065785
§ 371 (c)(1),
(2) Date: Feb. 2, 2015

(87) PCT Pub. No.: WO2014/019950
PCT Pub. Date: Feb. 6, 2014

(65) Prior Publication Data
US 2015/0164078 A1 Jun. 18, 2015

(30) Foreign Application Priority Data

Aug. 3, 2012 (EP) .................................. 12179260
Nov. 30, 2012 (EP) .................................. 12195021

(51) Int. Cl.
*A01N 43/80* (2006.01)
*G06Q 30/00* (2023.01)
*G06Q 30/018* (2023.01)

(52) U.S. Cl.
CPC ........... *A01N 43/80* (2013.01); *G06Q 30/018* (2013.01)

(58) Field of Classification Search
None
See application file for complete search history.

(56) References Cited

U.S. PATENT DOCUMENTS

2010/0227010 A1* 9/2010 Jones .................... A01N 37/02
424/747
2010/0240643 A1* 9/2010 Fischer .................. A01N 43/38
514/229.2

FOREIGN PATENT DOCUMENTS

WO 2011/067272 A1 6/2011
WO 2012/163945 A1 12/2012
WO 2012/163960 A1 12/2012

OTHER PUBLICATIONS

Silverman, "The Organic Chemistry of Drug Design and Drug Action", p. 19-21, 1992.*
Jagodzinska et al., "Assessing the Bioisosterism of the Trifluoromethyl Group with a Protease Probe", ChemMedChem 2009, 4, 49-51. (Year: 2009).*
International Search Report dated Sep. 23, 2013 for International Patent Application No. PCT/EP2013/065785.
Silverman, R.B., The Organic Chemistry of Drug Design and Drug Action, 2nd Edition, Elsevier Academic Press: Burlington, MA, 2004. pp. 25-32 (ISBN 978-0126437324).

* cited by examiner

*Primary Examiner* — Jianfeng Song
(74) *Attorney, Agent, or Firm* — BakerHostetler

(57) ABSTRACT

The present invention relates to methods, preferably for controlling and/or preventing infestation of stinkbugs in soybean, comprising applying to a crop of soybean plants, the locus thereof, or propagation material thereof, a compound of formula (I) wherein —B$^1$—B$^2$—B$^3$— is —C=N—O—, —C=N—CH$_2$—, —C=CH$_2$—O— or —N—CH$_2$—CH$_2$—; L is a direct bond or methylene; A$^1$ and A$^2$ are C—H, or one of A$^1$ and A$^2$ is C—H and the other is N; X$^1$ is group X R$^1$ is C$_1$-C$_4$alkyl, C$_1$-C$_4$haloalkyl or C$_3$-C$_6$cycloalkyl; R$^2$ is chlorodifluoromethyl or trifluoromethyl; each R$^3$ is independently bromo, chloro, fluoro or trifluoromethyl; R$^4$ is hydrogen, halogen, methyl, halomethyl or cyano; R$^5$ is hydrogen; or R$^4$ and R$^5$ together form a bridging 1,3-butadiene group; p is 2 or 3.

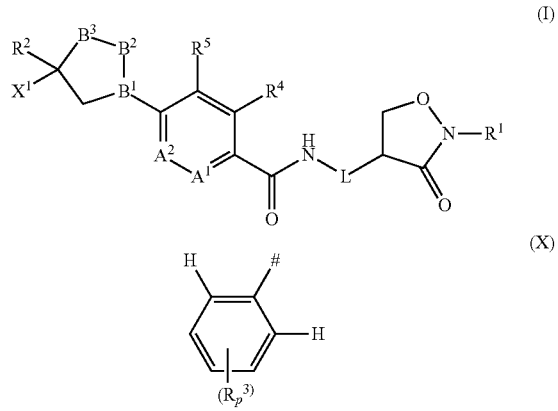

41 Claims, No Drawings

METHODS OF PEST CONTROL IN SOYBEAN

RELATED APPLICATION INFORMATION

This application is a 371 of International Application No. PCT/EP2013/065785, filed 26 Jul. 2013, which claims priority to EP Patent Application No. 12179260.0, filed 3 Aug. 2012, and EP Patent Application No. 12195021.6 filed 30 Nov. 2012, the contents of which are incorporated herein by reference herein.

The present invention relates to methods of pest control in soybean crops.

Stink bugs (*Hemiptera Pentatomidae*) are true bugs which can be significant pests when present in large numbers. The nymphs and adults have piercing mouthparts which most use to suck sap from plants. According to Stewart et al., Soybean Insects—Stink bugs, University of Tennessee Institute of Agriculture, W200 09-0098, stink bugs are probably the most common pest problem in soybean. Although they may feed on many parts of the plant, they typically target developing seed including the pods, meaning that injury to soybean seed is the primary problem associated with stink bug infestations.

Of the complex of sucking bugs that occur in cultivation, the brown stinkbug *Euschistus heros* is currently considered to be the most abundant species in northern Parana to Central Brazil (Correa-Ferreira & Panizzi, 1999), and is a significant problem in soybean (Schmidt et al., 2003). The bugs occur in soybeans from the vegetative stage and are harmful from the beginning of pod formation until grain maturity. They cause damage to the seed (Galileo & Heinrichs 1978a, Panizzi & Slansky Jr., 1985) and can also open the way to fungal diseases and cause physiological disorders, such as soybean leaf retention (Galileo & Heinrichs 1978, Todd & Herzog, 1980).

Control of stinkbugs in soybean is often vital to prevent significant economic damage. Insecticides commonly used to control stinkbugs include pyrethroids, neonicotinoids and organophosphates, although pyrethroid insecticides are usually the method of choice for controlling stink bugs in soybean. However, there are increasing problems with insecticide resistance, particularly in brown stink bug populations and particularly to pyrethroids. *Euschistus heros* can also be difficult to manage using organophosphates or endosulfan (Sosa-Gomez et al., 2009). There is therefore a need for effective alternative methods of controlling stinkbugs in soybean.

Compounds that are insecticidally, acaricidally, nematicidally and/or moluscicidally active by antagonism of the gamma-aminobutyric acid (GABA)-gated chloride channel, and which comprise a partially saturated heterocycle that is substituted by a haloalkyl substituent and one or two optionally substituted aromatic or heteroaromatic rings, represent a new class of pesticides that are described for example in Ozoe et al. Biochemical and Biophysical Research Communications, 391 (2010) 744-749. Compounds from this class are broadly described in WO 2005/085216 (EP1731512), WO 2007/123853, WO 2007/075459, WO 2009/002809, WO 2008/019760, WO 2008/122375, WO 2008/128711, WO 2009/097992, WO 2010/072781, WO 2010/072781, WO 2008/126665, WO 2007/125984, WO 2008/130651, JP 2008110971, JP 2008133273, JP 2009108046, WO 2009/022746, WO 2009/022746, WO 2010/032437, WO 2009/080250, WO 2010/020521, WO 2010/025998, WO 2010/020522, WO 2010/084067, WO 2010/086225, WO 2010/149506, WO 2010/108733 and WO 2011/067272.

It has now surprisingly been found that particular insecticides from this new class of gamma-aminobutyric acid (GABA)-gated chloride channel antagonists (disclosed in e.g. WO 2011/067272) are highly effective at controlling stinkbugs, and may in some cases provide greater control than the current market standard. It has also surprisingly been found that some compounds exhibit significantly higher activity against stinkbugs than structurally similar compounds. These compounds therefore represent an important new solution for safeguarding soybean crops from stinkbugs, particularly where stink bugs are resistant to current methods.

In a first aspect the invention provides a method comprising applying to a crop of soybean plants, the locus thereof, or propagation material thereof, a compound of formula I

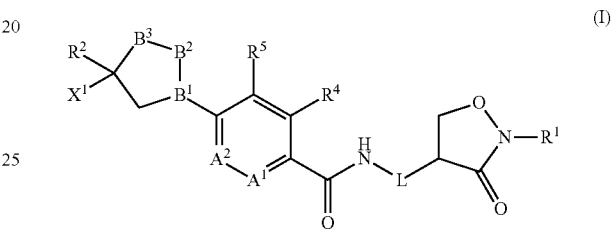

wherein
—$B^1$—$B^2$—$B^3$— is —C=N—O—, —C=N—$CH_2$—, —C=$CH_2$—O— or —N—$CH_2$—$CH_2$—;
L is a direct bond or methylene;
$A^1$ and $A^2$ are C—H, or one of $A^1$ and $A^2$ is C—H and the other is N;
$X^1$ is group X

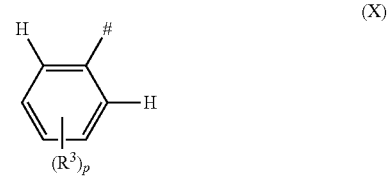

$R^1$ is $C_1$-$C_4$alkyl, $C_1$-$C_4$haloalkyl or $C_3$-$C_6$cycloalkyl;
$R^2$ is chlorodifluoromethyl or trifluoromethyl;
each $R^3$ is independently bromo, chloro, fluoro or trifluoromethyl;
$R^4$ is hydrogen, halogen, methyl, halomethyl or cyano;
$R^5$ is hydrogen;
or $R^4$ and $R^5$ together form a bridging 1,3-butadiene group;
p is 2 or 3.

In a further aspect the invention provides a method of controlling and/or preventing infestation of stinkbugs in soybean comprising applying to a crop of soybean plants, the locus thereof, or propagation material thereof, a compound of formula I. The stinkbugs may be those that are resistant to one or more other insecticides.

In a further aspect the invention provides a method of controlling and/or preventing infestation of stinkbugs in a crop of useful plants comprising applying to a crop of useful plants, the locus thereof, or propagation material thereof, a compound of formula I. The stinkbugs may be those that are resistant to one or more other insecticides.

In a further aspect the invention provides use of a compound of formula I for control of stinkbugs in a crop of useful plants. The use may be for controlling stinkbugs that are resistant to one or more other insecticides.

In a further aspect the invention provides a method of controlling and/or preventing infestation of insects from the genus *Euschistus* in a crop of useful plants comprising applying to a crop of useful plants, the locus thereof, or propagation material thereof, a compound of formula I. The insects from the genus *Euschistus* may be those that are resistant to one or more other insecticides.

In a further aspect the invention provides use of a compound of formula I for control of insects from the genus *Euschistus* in a crop of useful plants. The use may be for controlling insects from the genus *Euschistus* that are resistant to one or more other insecticides.

In a further aspect the invention provides a method of controlling and/or preventing infestation of insects from the genus *Euschistus* in a crop of soybean plants comprising applying to a crop of soybean, the locus thereof, or propagation material thereof, a compound of formula I. The insects from the genus *Euschistus* may be those that are resistant to one or more other insecticides.

In a further aspect the invention provides use of a compound of formula I for control of insects from the genus *Euschistus* in a crop of soybean plants. The use may be for controlling insects from the genus *Euschistus* that are resistant to one or more other insecticides.

In a further aspect the invention provides a method of controlling and/or preventing infestation of *Euschistus heros* in a crop of useful plants comprising applying to a crop of useful plants, the locus thereof, or propagation material thereof, a compound of formula I. The *Euschistus heros* may be resistant to one or more other insecticides.

In a further aspect the invention provides use of a compound of formula I for control of *Euschistus heros* in a crop of useful plants. The use may be for controlling *Euschistus heros* that is resistant to one or more other insecticides.

In a further aspect the invention provides a method of controlling and/or preventing infestation of *Euschistus heros* in a crop of soybean plants comprising applying to a crop of soybean, the locus thereof, or propagation material thereof, a compound of formula I. The *Euschistus heros* may be resistant to one or more other insecticides.

In a further aspect the invention provides use of a compound of formula I for control of *Euschistus heros* in a crop of soybean plants. The use may be for controlling insects *Euschistus heros* that are is resistant to one or more other insecticides.

Stinkbugs that are resistant to one or more other insecticides are preferably resistant to pyrethroid, neonicotinoids and/or organophosphates, more preferably pyrethroid insecticides.

In a further aspect the invention provides a method for obtaining regulatory approval for the use of one or more of a compound of formula I to control stinkbugs, in particular the genus *Euschistus* and in particular the species *Euschistus heros*, and in particular in soybean plants, comprising at least one step of referring to, submitting or relying on biological data showing that said active ingredient reduces insect pressure.

The compounds of formula (I) may exist in different geometric or optical isomers or tautomeric forms. This invention covers all such isomers and tautomers and mixtures thereof in all proportions as well as isotopic forms such as deuterated compounds. The invention also covers salts and N-oxides of the compounds of the invention.

Alkyl groups (either alone or as part of a larger group, such as alkoxy-, alkylthio-, alkylsulfinyl-, alkylsulfonyl-, alkylcarbonyl- or alkoxycarbonyl-) can be in the form of a straight or branched chain and are, for example, methyl, ethyl, propyl, prop-2-yl, butyl, but-2-yl, 2-methyl-prop-1-yl or 2-methyl-prop-2-yl. The alkyl groups are preferably $C_1$-$C_6$, more preferably $C_1$-$C_4$, most preferably $C_1$-$C_3$ alkyl groups. Where an alkyl moiety is said to be substituted, the alkyl moiety is preferably substituted by one to four substituents, most preferably by one to three substituents.

Halogen is fluorine, chlorine, bromine or iodine.

Haloalkyl groups are alkyl groups which are substituted by one or more of the same or different halogen atoms and are, for example, difluoromethyl, trifluoromethyl, chlorodifluoromethyl or 2,2,2-trifluoro-ethyl.

Preferred substituent definitions are described below and may be combined in any combination, including with original definitions.

—$B^1$—$B^2$—$B^3$— is preferably —C=N—O—.

$A^1$ and $A^2$ are preferably C—H.

Preferably $X^1$ is 3,5-dichlorophenyl-, 3-chloro-4-fluorophenyl-, 3-fluoro-4-chlorophenyl-, 3,4-dichlorophenyl-, 3-chloro-4-bromophenyl-, 3,5-dichloro-4-fluorophenyl-, 3,4,5-trichlorophenyl-, 3,4,5-trifluorophenyl-, 3-chloro-5-bromophenyl-, 3-chloro-5-fluorophenyl-, 3-chloro-5-(trifluoromethyl)phenyl-, 3,4-dichloro-5-(trifluoromethyl)phenyl-, 3,5-bis(trifluoromethyl)phenyl-, 4-chloro-3,5-bis(trifluoromethyl)phenyl-, 3-(trifluoromethyl)phenyl-, more preferably 3-chloro-5-bromophenyl-, 3-chloro-5-(trifluoromethyl)phenyl-, 3,5-dichloro-4-fluorophenyl-, 3,4,5-trichlorophenyl-, 3,5-bis(trifluoromethyl)phenyl-, 3-(trifluoromethyl)phenyl-, 3,5-dichloro-4-bromophenyl-, 3-bromo-5-(trifluoromethyl)phenyl-, 3,5-dibromophenyl-, or 3,4-dichlorophenyl-, even more preferably 3,5-dichloro-phenyl, 3,5-dichloro-4-fluorophenyl-, 3,4,5-trichlorophenyl-, 3,5-bis(trifluoromethyl)phenyl, most preferably $R^4$ is 3,5-dichloro-phenyl.

$R^1$ is preferably methyl, ethyl, propyl, butyl, cyclopropyl, cyclobutyl, trifluoroethyl, difluoroethyl. Ethyl and trifluoroethyl are particularly preferred.

$R^2$ is preferably trifluoromethyl.

Preferably each $R^3$ is independently chlorine or fluorine, most preferably chlorine.

$R^4$ is preferably chloro or methyl, most preferably methyl.

$R^5$ is preferably hydrogen.

L is preferably a direct bond.

In one group of compounds —$B^1$—$B^2$—$B^3$— is —C=N—O—.

In one group of compounds —$B^1$—$B^2$—$B^3$— is —C=N—$CH_2$—.

In one group of compounds —$B^1$—$B^2$—$B^3$— is —C=$CH_2$—O—.

In one group of compounds —$B^1$—$B^2$—$B^3$— is —N—$CH_2$—$CH_2$—.

In one embodiment $A^1$ and $A^2$ are C—H, $R^2$ is trifluoromethyl, and $R^5$ is hydrogen.

In one embodiment $A^1$ and $A^2$ are C—H, $R^2$ is trifluoromethyl, $R^5$ is hydrogen and L is a direct bond.

In one embodiment —$B^1$—$B^2$—$B^3$— is —C=N—O—, $A^1$ and $A^2$ are C—H, $R^2$ is trifluoromethyl, $R^5$ is hydrogen and L is a direct bond.

In one embodiment —$B^1$—$B^2$—$B^3$— is —C=N—O—, $A^1$ and $A^2$ are C—H, $R^2$ is trifluoromethyl, $R^4$ is halogen or methyl, $R^5$ is hydrogen and L is a direct bond.

In one embodiment —B¹—B²—B³— is —C=N—O—, A¹ and A² are C—H, R² is trifluoromethyl, R³ is chloro or fluoro, R⁴ is halogen or methyl, R⁵ is hydrogen and L is a direct bond.

In one embodiment A¹ and A² are C—H, R² is trifluoromethyl, R⁴ is methyl, R⁵ is hydrogen, each R³ is chlorine, p is 2.

In one embodiment R¹ is $C_1$-$C_4$alkyl, e.g. methyl, ethyl or propyl, e.g. methyl or ethyl, e.g. ethyl.

In one embodiment X¹ is group Xa

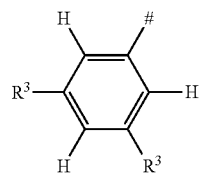

In one embodiment R¹ is $C_1$-$C_5$alkyl, e.g. methyl, ethyl or propyl, e.g. methyl or ethyl, e.g. ethyl and X¹ is group Xa.

In one embodiment R¹ is methyl.
In one embodiment R¹ is ethyl.
In one embodiment R¹ is 2,2,2-trifluoroethyl.
In one embodiment R¹ is 2,2-difluoroethyl.
In one embodiment X¹ is 3,5-dichlorophenyl.
In one embodiment X¹ is 3,5-dichloro-4-fluorophenyl.
In one embodiment X¹ is 3,4,5-trichlorophenyl.
In one embodiment R¹ is methyl and X¹ is 3,5-dichlorophenyl.
In one embodiment R¹ is methyl and X¹ is 3,5-dichloro-4-fluorophenyl.
In one embodiment R¹ is methyl and X¹ is 3,4,5-trichlorophenyl.
In one embodiment R¹ is ethyl and X¹ is 3,5-dichlorophenyl.
In one embodiment R¹ is ethyl and X¹ is 3,5-dichloro-4-fluorophenyl.
In one embodiment R¹ is ethyl and X¹ is 3,4,5-trichlorophenyl.
In one embodiment R¹ is 2,2,2-trifluoroethyl and X¹ is 3,5-dichlorophenyl.
In one embodiment R¹ is 2,2,2-trifluoroethyl and X¹ is 3,5-dichloro-4-fluorophenyl.
In one embodiment R¹ is 2,2,2-trifluoroethyl and X¹ is 3,4,5-trichlorophenyl.
In one embodiment R¹ is 2,2-difluoroethyl and X¹ is 3,5-dichlorophenyl.
In one embodiment R¹ is 2,2-difluoroethyl and X¹ is 3,5-dichloro-4-fluorophenyl.
In one embodiment R¹ is 2,2-difluoroethyl and X¹ is 3,4,5-trichlorophenyl.

Compounds of formula I may exist as compounds of formula I* or compounds of formula I**.

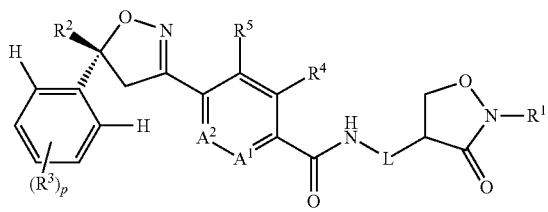

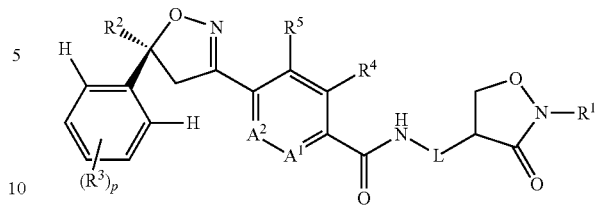

Compounds of formula I** are more biologically active than compounds of formula I*. Compounds of formula I may be a mixture of compounds I* and I in any ratio e.g. in a molar ratio of 1:99 to 99:1, e.g. 10:1 to 1:10, e.g. a substantially 50:50 molar ratio. Preferably the compound of formula I is a racemic mixture of the compounds of formula I and I* or is enantiomerically enriched for the compound of formula I. For example, when the compound of formula I is an enantiomerically enriched mixture of formula I, the molar proportion of compound I compared to the total amount of both enantiomers is for example greater than 50%, e.g. at least 55, 60, 65, 70, 75, 80, 85, 90, 95, 96, 97, 98, or at least 99%. In a preferred embodiment the compound of formula I is a compound of formula I in substantially pure form, e.g. it is provided substantially in the absence of the alternative enantiomer.

Compounds of formula I may also exist as compounds of formula I' or compounds of formula I".

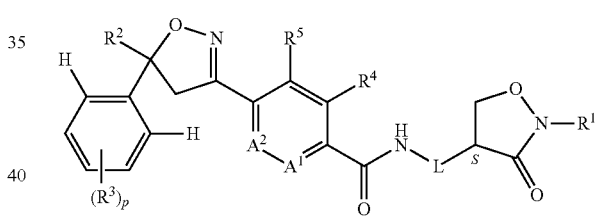

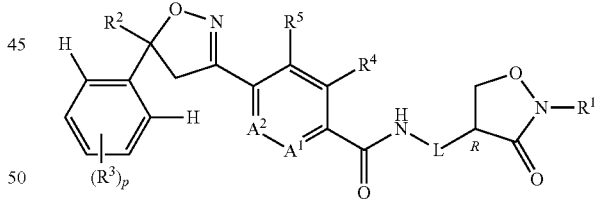

(S=S stereochemistry, R=R stereochemistry)

Compounds of formula I" are often more biologically active than compounds of formula I'. The compound of formula I may be a mixture of compounds I' and I" in any ratio e.g. in a molar ratio of 1:99 to 99:1, e.g. 10:1 to 1:10, e.g. a substantially 50:50 molar ratio. Preferably the compound of formula I is a racemic mixture of the compounds of formula I" and I' or is enantiomerically enriched for the compound of formula I". For example, when the compound of formula I is an enantiomerically enriched mixture of formula I", the molar proportion of compound I" compared to the total amount of both enantiomers is for example greater than 50%, e.g. at least 55, 60, 65, 70, 75, 80, 85, 90, 95, 96, 97, 98, or at least 99%. In one embodiment the compound of formula I is a compound of formula I" in substantially pure form, e.g. it is provided substantially in the absence of the alternative enantiomer.

The above stereocentres give rise to four stereoisomers:

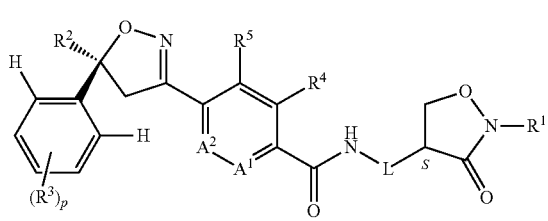
(I-i)

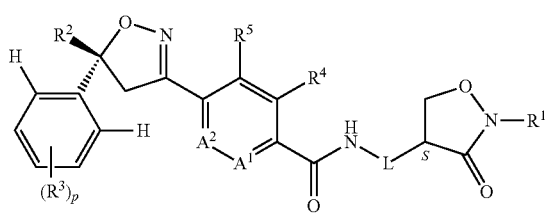
(I-ii)

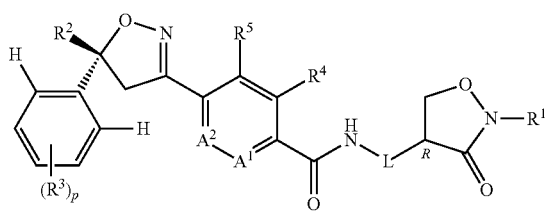
(I-iii)

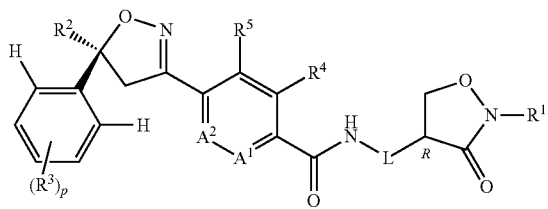
(I-iv)

In one embodiment the compound of formula I is a mixture comprising compounds I-i, I-iii and I-iv, wherein the mixture is enriched for the compound of formula I-iv, e.g. the molar proportion of compound I-iv compared to the total amount of the four isomers is for example greater than 25%, e.g. at least 30, 35, 40, 50, 55, 60, 65, 70, 75, 80, 85, 90, 95, 96, 97, 98, or at least 99%.

In another embodiment the compound of formula I is a mixture comprising compounds I-i, I-ii and I-iv, wherein the molar amount of the compound of formuila I-iv is greater than the molar amount of the compound of formula I-i, and the molar amount of the compound and the molar amount of the compound of formula I-iii, in other words, the compound of formula I-iv is the most abundant isomer in the mixture. For example the molar amount of compound of formula I-iv is at least 1, 2, 5, 10, 15, 20, 25, 30, 35, 40, 45, 50, 55, 60, 56, 70, 75, 80, 85, 90, or even at least 95% greater than the combined amount of compound of formula I-iv and I-i, the combined amount of the compound of formula I-iv and and the combined amount of the compound of formula I-iv and I-iii.

Although $B^1$—$B^2$—$B^3$ is shown above as C=N—O, the same applies in respect of the stereoisomers when $B^1$—$B^2$—$B^3$ is —C=N—CH$_2$—, —C=CH$_2$—O— and —N—CH$_2$—CH$_2$—.

In one embodiment the compound of formula I-iv is the most abundant isomer and $R^1$ is $C_1$-$C_4$alkyl, e.g. methyl, ethyl or propyl, e.g. methyl or ethyl, e.g. ethyl.

In one embodiment the compound of formula I-iv is the most abundant isomer and $R^1$ is $C_1$-$C_4$alkyl, e.g. methyl, ethyl or propyl, e.g. methyl or ethyl, e.g. ethyl and $X^1$ is group Xa.

In one embodiment the compound of formula I-iv is the most abundant isomer and $R^1$ is methyl.

In one embodiment the compound of formula I-iv is the most abundant isomer and $R^1$ is ethyl.

In one embodiment the compound of formula I-iv is the most abundant isomer and $R^1$ is 2,2,2-trifluoroethyl.

In one embodiment the compound of formula I-iv is the most abundant isomer and $R^1$ is 2,2-difluoroethyl.

Preferred compounds of formula I are shown in the Tables below.

TABLE A

Compounds of formula (I-a)

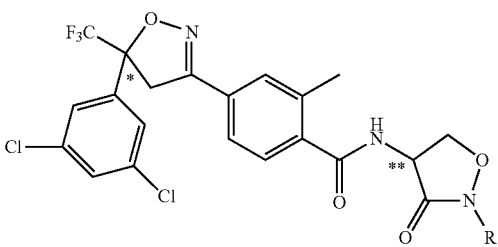
(I-a)

Table A provides 78 compounds and mixtures of formula (I-a) wherein $R^1$ has the values listed in table X below. The symbols * and ** indicate the location of the chiral centres.

TABLE B

Compounds of formula (I-b)

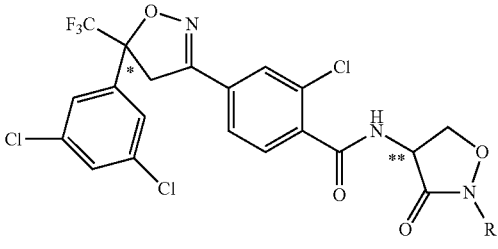
(I-b)

Table B provides 78 compounds and mixtures of formula (I-b) wherein $R^1$ has the values listed in table X below. The symbols * and ** indicate the location of the chiral centres.

TABLE C

Compounds of formula (I-c)

(I-c)

Table C provides 78 compounds and mixtures of formula (I-c) wherein R¹ has the values listed in table X below. The symbols * and ** indicate the location of the chiral centres.

TABLE D

Compounds of formula (I-d)

(I-d)

Table D provides 78 compounds and mixtures of formula (I-d) wherein R¹ has the values listed in table X below. The symbols * and ** indicate the location of the chiral centres.

TABLE E

Compounds of formula (I-e)

(I-e)

Table E provides 78 compounds and mixtures of formula (I-e) wherein R¹ has the values listed in table X below. The symbols * and ** indicate the location of the chiral centres.

TABLE F

Compounds of formula (I-f)

(I-f)

Table F provides 78 compounds and mixtures of formula (I-f) wherein R¹ has the values listed in table X below. The symbols * and ** indicate the location of the chiral centres.

Table X represents Table A when X is A, Table B when X is B, Table C when X is C, Table D when X is D, Table E when X is E, Table F when X is F.

| Compound numbers | Stereochemistry at * | Stereochemistry at ** | R¹ |
|---|---|---|---|
| X.1 | Racemic mixture | Racemic mixture | ethyl- |
| X.2 | Racemic mixture | Racemic mixture | butyl- |
| X.3 | Racemic mixture | Racemic mixture | but-2-yl- |
| X.4 | Racemic mixture | Racemic mixture | 3-bromo-propyl- |
| X.5 | Racemic mixture | Racemic mixture | 2,2,2-trifluoro-ethyl- |
| X.6 | Racemic mixture | Racemic mixture | 3,3,3-trifluoro-propyl- |
| X.7 | Racemic mixture | Racemic mixture | cyclobutyl- |
| X.8 | Racemic mixture | Racemic mixture | methyl |
| X.9 | Racemic mixture | Racemic mixture | propyl |
| X.10 | Racemic mixture | Racemic mixture | 2,2-difluoro-ethyl- |
| X.11 | Racemic mixture | Racemic mixture | 2-fluoro-ethyl- |
| X.12 | S | Racemic mixture | ethyl- |
| X.13 | S | Racemic mixture | butyl- |
| X.14 | S | Racemic mixture | but-2-yl- |
| X.15 | S | Racemic mixture | 3-bromo-propyl- |
| X.16 | S | Racemic mixture | 2,2,2-trifluoro-ethyl- |
| X.17 | S | Racemic mixture | 3,3,3-trifluoro-propyl- |
| X.18 | S | Racemic mixture | cyclobutyl- |
| X.19 | S | Racemic mixture | methyl |
| X.20 | S | Racemic mixture | propyl |
| X.21 | S | Racemic mixture | 2,2-difluoro-ethyl- |
| X.22 | S | Racemic mixture | 2-fluoro-ethyl- |
| X.23 | Racemic mixture | Racemic mixture | isopropyl |
| X.24 | Racemic mixture | Racemic mixture | cyclopropyl |
| X.25 | S | Racemic mixture | isopropyl |
| X.26 | S | Racemic mixture | cyclopropyl |
| X.27 | Racemic mixture | S | ethyl- |
| X.28 | Racemic mixture | S | butyl- |
| X.29 | Racemic mixture | S | but-2-yl- |
| X.30 | Racemic mixture | S | 3-bromo-propyl- |
| X.31 | Racemic mixture | S | 2,2,2-trifluoro-ethyl- |
| X.32 | Racemic mixture | S | 3,3,3-trifluoro-propyl- |
| X.33 | Racemic mixture | S | cyclobutyl- |
| X.34 | Racemic mixture | S | methyl |
| X.35 | Racemic mixture | S | propyl |
| X.36 | Racemic mixture | S | 2,2-difluoro-ethyl- |
| X.37 | Racemic mixture | S | 2-fluoro-ethyl- |
| X.38 | S | S | ethyl- |
| X.39 | S | S | butyl- |
| X.40 | S | S | but-2-yl- |
| X.41 | S | S | 3-bromo-propyl- |
| X.42 | S | S | 2,2,2-trifluoro-ethyl- |
| X.43 | S | S | 3,3,3-trifluoro-propyl- |
| X.44 | S | S | cyclobutyl- |
| X.45 | S | S | methyl |
| X.46 | S | S | propyl |
| X.47 | S | S | 2,2-difluoro-ethyl- |
| X.48 | S | S | 2-fluoro-ethyl- |
| X.49 | Racemic mixture | S | isopropyl |
| X.50 | Racemic mixture | S | cyclopropyl |
| X.51 | S | S | isopropyl |
| X.52 | S | S | cyclopropyl |
| X.53 | Racemic mixture | R | ethyl- |
| X.54 | Racemic mixture | R | butyl- |
| X.55 | Racemic mixture | R | but-2-yl- |
| X.56 | Racemic mixture | R | 3-bromo-propyl- |
| X.57 | Racemic mixture | R | 2,2,2-trifluoro-ethyl- |
| X.58 | Racemic mixture | R | 3,3,3-trifluoro-propyl- |
| X.59 | Racemic mixture | R | cyclobutyl- |
| X.60 | Racemic mixture | R | methyl |
| X.61 | Racemic mixture | R | propyl |
| X.62 | Racemic mixture | R | 2,2-difluoro-ethyl- |
| X.63 | Racemic mixture | R | 2-fluoro-ethyl- |
| X.64 | S | R | ethyl- |
| X.65 | S | R | butyl- |
| X.66 | S | R | but-2-yl- |
| X.67 | S | R | 3-bromo-propyl- |
| X.68 | S | R | 2,2,2-trifluoro-ethyl- |
| X.69 | S | R | 3,3,3-trifluoro-propyl- |

| Compound numbers | Stereochemistry at * | Stereochemistry at ** | R¹ |
|---|---|---|---|
| X.70 | S | R | cyclobutyl- |
| X.71 | S | R | methyl |
| X.72 | S | R | propyl |
| X.73 | S | R | 2,2-difluoro-ethyl- |
| X.74 | S | R | 2-fluoro-ethyl- |
| X.75 | Racemic mixture | R | isopropyl |
| X.76 | Racemic mixture | R | cyclopropyl |
| X.77 | S | R | isopropyl |
| X.78 | S | R | cyclopropyl |

The compounds of the invention may be made by a variety of methods as shown in Schemes 1 to 3.

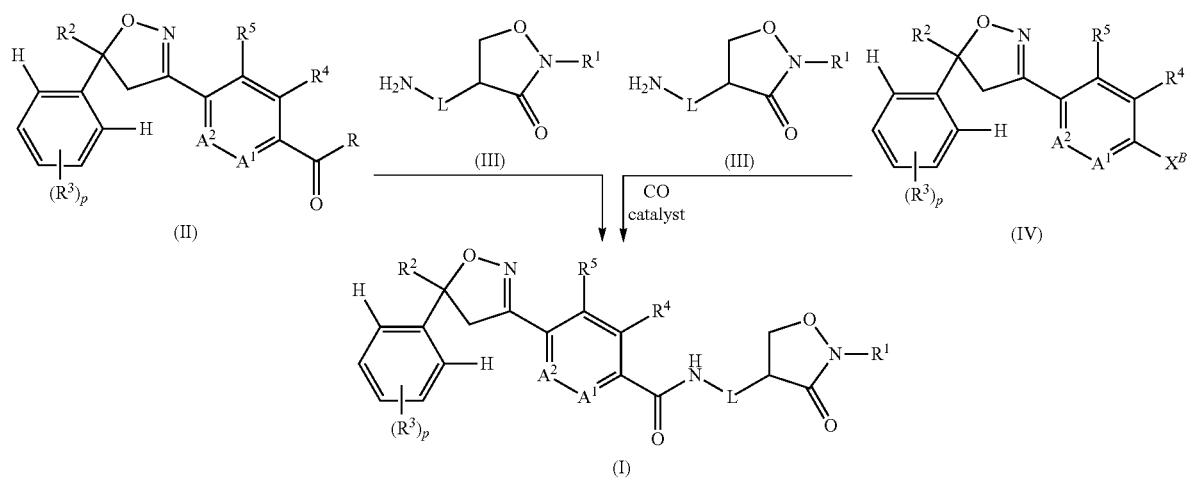

Scheme 1

1) Compounds of formula (I), can be prepared by reacting a compound of formula (II) wherein R is OH, $C_1$-$C_6$alkoxy or Cl, F or Br, with an amine of formula (III) as shown in Scheme 1. When R is OH such reactions are usually carried out in the presence of a coupling reagent, such as N,N'-dicyclohexylcarbodiimide ("DCC"), 1-ethyl-3-(3-dimethyl-amino-propyl)carbodiimide hydrochloride ("EDC") or bis(2-oxo-3-oxazolidinyl)phosphonic chloride ("BOP-Cl"), in the presence of a base, and optionally in the presence of a nucleophilic catalyst, such as hydroxybenzotriazole ("HOBT"). When R is Cl, such reactions are usually carried out in the presence of a base, and optionally in the presence of a nucleophilic catalyst. Alternatively, it is possible to conduct the reaction in a biphasic system comprising an organic solvent, preferably ethyl acetate, and an aqueous solvent, preferably a solution of sodium hydrogen carbonate. When R is $C_1$-$C_6$alkoxy it is sometimes possible to convert the ester directly to the amide by heating the ester and amine together in a thermal process. Suitable bases include pyridine, triethylamine, 4-(dimethylamino)-pyridine ("DMAP") or diisopropylethylamine (Hunig's base). Preferred solvents are N,N-dimethylacetamide, tetrahydrofuran, dioxane, 1,2-dimethoxyethane, ethyl acetate and toluene. The reaction is carried out at a temperature of from 0° C. to 100° C., preferably from 15° C. to 30° C., in particular at ambient temperature Amines of formula (III) are either known in the literature or can be prepared using methods known to a person skilled in the art.

2) Acid halides of formula (II), wherein R is Cl, F or Br, may be made from carboxylic acids of formula (II), wherein R is OH, under standard conditions, as described for example in WO 2009/080250.

3) Carboxylic acids of formula (II), wherein R is OH, may be formed from esters of formula (II), wherein R is $C_1$-$C_6$alkoxy as described for example in WO 2009/080250.

4) Compounds of formula (I) can be prepared by reacting a compound of formula (IV) wherein $X^B$ is a leaving group, for example a halogen, such as bromo, with carbon monoxide and an amine of formula (III), in the presence of a catalyst, such as palladium(II) acetate or bis-(triphenylphosphine)palladium(II) dichloride, optionally in the presence of a ligand, such as triphenylphosphine, and a base, such as sodium carbonate, pyridine, triethylamine, 4-(dimethylamino)-pyridine ("DMAP") or diisopropylethylamine (Hunig's base), in a solvent, such as water, N,N-dimethylformamide or tetrahydrofuran. The reaction is carried out at a temperature of from 50° C. to 200° C., preferably from 100° C. to 150° C. The reaction is carried out at a pressure of from 50 to 200 bar, preferably from 100 to 150 bar.

5) Compounds of formula (IV) wherein $X^B$ is a leaving group, for example a halogen, such as bromo, can be made by various methods, for example as described in WO 2009/080250.

Scheme 2

6) Alternatively, compounds of formula (I), can be prepared by various methods from an intermediate of formula (V) as shown in Scheme 2 wherein $X^B$ is a leaving group, for example a halogen, such as bromo, or $X^B$ is cyano, formyl or acetyl according to similar methods to those described in WO09080250. An intermediate of formula (V) can be prepared for example from an intermediate of formula (VI) as described in the same reference.

Scheme 3

7) Alternatively, compounds of formula (I) can be prepared by various methods from an intermediate of formula (VII) as shown in Scheme 3 wherein $X^C$ is $X^C$-1 or $X^C$-2 according to similar methods to those described in WO 2009/080250.

8) Compounds of formula (VII) wherein $X^C$ is $X^C$ is $X^C$-1 or $X^C$-2 can be prepared from a compound of formula (Va) from a compound of formula (VII) wherein $X^C$ is $CH_2$-halogen using similar methods to those described in WO 2009/080250.

9) Compounds of formula (VII) wherein $X^C$ is $CH_2$-halogen, such as bromo or chloro, can be prepared by reacting a methyl ketone of formula (Va) with a halogenating agent, such as bromine or chlorine, in a solvent, such as acetic acid, at a temperature of from 0° C. to 50° C., preferably from ambient temperature to 40° C.

Other methods for the preparation of compounds of formula I are described in PCT/EP2010/068605, which is incorporated herein by reference.

The methods and uses of the invention are preferably for controlling and/or preventing infestation of the soybean crop by stink bugs, including stink bugs that are resistant to other insecticides, e.g. pyrethroid insecticides. Stinkbugs that are "resistant" to a particular insecticide refers e.g. to strains of stinkbugs that are less sensitive to that insecticide compared to the expected sensitivity of the same species of stinkbug. The expected sensitivity can be measured using e.g. a strain that has not previously been exposed to the insecticide.

Application is of the compounds of the invention is preferably to a crop of soybean plants, the locus thereof or propagation material thereof. Preferably application is to a crop of soybean plants or the locus thereof, more preferably to a crop of soybean plants. Application may be before infestation or when the pest is present. Application of the compounds of the invention can be performed according to any of the usual modes of application, e.g. foliar, drench, soil, in furrow etc. However, control of stinkbugs is usually achieved by foliar application, which is the preferred mode of application according to the invention.

The compounds of the invention may be applied in combination with an attractant. An attractant is a chemical that causes the insect to migrate towards the location of application. For control of stinkbugs it can be advantageous to apply the compounds of the invention with an attractant, particularly when the application is foliar. Stinkbugs are often located near to the ground, and application of an attractant may encourage migration up the plant towards the active ingredient. Suitable attractants include glucose, sacchrose, salt, glutamate (e.g. Aji-no-moto™), citric acid (e.g. Orobor™), soybean oil, peanut oil and soybean milk. Glutamate and citric acid are of particular interest, with citric acid being preferred.

An attractant may be premixed with the compound of the invention prior to application, e.g. as a readymix or tankmix, or by simultaneous application or sequential application to the plant. Suitable rates of attractants are for example 0.02 kg/ha-3 kg/ha.

The compounds of the invention are preferably used for pest control on soybean at 1:500 g/ha, preferably 10-70 g/ha.

The compounds of the invention are suitable for use on any soybean plant, including those that have been genetically modified to be resistant to active ingredients such as herbicides, or to produce biologically active compounds that control infestation by plant pests.

In a further preferred embodiment, transgenic plants and plant cultivars obtained by genetic engineering methods, if appropriate in combination with conventional methods (Genetically Modified Organisms), and parts thereof, are treated. Particularly preferably, plants of the plant cultivars which are in each case commercially available or in use are treated according to the invention. Plant cultivars are understood as meaning plants having novel properties ("traits") which have been obtained by conventional breeding, by mutagenesis or by recombinant DNA techniques.

These can be cultivars, bio- or genotypes. Depending on the plant species or plant cultivars, their location and growth conditions (soils, climate, vegetation period, diet), the treatment according to the invention may also result in superadditive "synergistic" effects.

Thus, for example, reduced application rates and/or a widening of the activity spectrum and/or an increase in the activity of the substances and compositions which can be used according to the invention, better plant growth, increased tolerance to high or low temperatures, increased tolerance to drought or to water or soil salt content, increased flowering performance, easier harvesting, accelerated maturation, higher harvest yields, higher quality and/or a higher nutritional value of the harvested products, better storage stability and/or processability of the harvested products are possible, which exceed the effects which were actually to be expected.

The preferred transgenic plants or plant cultivars (obtained by genetic engineering) which are to be treated according to the invention include all plants which, by virtue of the genetic modification, received genetic material which imparts particularly advantageous, useful traits to these plants. Examples of such traits are better plant growth, increased tolerance to high or low temperatures, increased tolerance to drought or to water or soil salt content, increased flowering performance, easier harvesting, accelerated maturation, higher harvest yields, higher quality and/or a higher nutritional value of the harvested products, better storage stability and/or processability of the harvested products.

Further and particularly emphasized examples of such traits are a better defence of the plants against animal and microbial pests, such as against insects, mites, phytopathogenic fungi, bacteria and/or viruses, and also increased tolerance of the plants to certain herbicidally active compounds.

Traits that are emphasized in particular are the increased defence of the plants against insects, arachnids, nematodes and slugs and snails by virtue of toxins formed in the plants, in particular those formed in the plants by the genetic material from *Bacillus thuringiensis* (for example by the genes CryIA(a), CryIA(b), CryIA(c), CryIIA, CryIIIA, CryIIIB2, Cry9c, Cry2Ab, Cry3Bb and CryIF and also combinations thereof) (referred to herein as "Bt plants"). Traits that are also particularly emphasized are the increased defence of the plants against fungi, bacteria and viruses by systemic acquired resistance (SAR), systemin, phytoalexins, elicitors and resistance genes and correspondingly expressed proteins and toxins.

Traits that are furthermore particularly emphasized are the increased tolerance of the plants to certain herbicidally active compounds, for example imidazolinones, sulphonylureas, glyphosate or phosphinotricin (for example the "PAT" gene). The genes which impart the desired traits in question can also be present in combination with one another in the transgenic plants.

Examples of "Bt plants" are soya bean varieties which are sold under the trade names YIELD GARD(®)

Examples of herbicide-tolerant plants which may be mentioned are soybean varieties which are sold under the trade names Roundup Ready(®) (tolerance to glyphosate), Liberty Link(®) (tolerance to phosphinotricin), IMI(®) (tolerance to imidazolinones) and STS(®) (tolerance to sulphonylureas).

Herbicide-resistant plants (plants bred in a conventional manner for herbicide tolerance) which may be mentioned include the varieties sold under the name Clearfield® (for example maize).

Of particular interest are soybean plants carrying trains conferring resistance to 2.4D (e.g. Enlist®), glyphosate (e.g. Roundup Ready®, Roundup Ready 2 Yield®), sulfonylurea (e.g. STS®), glufosinate (e.g. Liberty Link®, Ignite®), Dicamba (Monsanto) HPPD tolerance (e.g. isoxaflutole herbicide) (Bayer CropScience, Syngenta). Double or triple stack in soybean plants of any of the traits described here are also of interest, including glyphosate and sulfonyl-urea tolerance (e.g. Optimum GAT®, plants stacked with STS® and Roundup Ready® or Roundup Ready 2 Yield®), dicamba and glyphosate tolerance (Monsanto). Soybean Cyst Nematode resistance soybean (SCN®— Syngenta) and soybean with Aphid resistant trait (AMT®— Syngneta) are also of interest.

These statements also apply to plant cultivars having these genetic traits or genetic traits still to be developed, which plant cultivars will be developed and/or marketed in the future.

The compounds of the invention may be used on soybean to control, for example, *Elasmopalpus lignosellus, Diloborerus abderus, Diabrotica speciosa, Sternechus subsignatus, Formicidae, Agrotis ipsilon, Julus* ssp., *Anticarsia gemmatalis, Megascelis* ssp., *Procornitermes* ssp., *Gryllotalpidae, Nezara viridula, Piezodorus* spp., *Acrosternum* spp., *Neomegalotomus* spp., *Cerotoma trifurcata, Popillia japonica, Edessa* spp., *Liogenys fuscus, Euchistus heros,* stalk borer, *Scaptocoris castanea, phyllophaga* spp., *Pseudoplusia includens, Spodoptera* spp., *Bemisia tabaci, Agriotes* spp., preferably *Diloboderus abderus, Diabrotica speciosa, Nezara viridula, Piezodorus* spp., *Acrosternum* spp., *Cerotoma trifurcata, Popillia japonica, Euchistus heros, phyllophaga* spp., *Agriotes* spp.

The compounds of the invention are preferably used on soybean to control stinkbugs, e.g. *Nezara* spp. (e.g. *Nezara viridula, Nezara antennata, Nezara hilare*), *Piezodorus* spp. (e.g. *Piezodorus guildinii*), *Acrosternum* spp. *Euchistus* spp. (e.g. *Euchistus heros, Euschistus servus*), *Halyomorpha halys, Plautia crossota, Riptortus clavatus, Rhopalus msculatus, Antestiopsis orbitalus, Dichelops* spp. (e.g. *Dichelops furcatus, Dichelops melacanthus*), *Eurygaster* spp. (e.g. *Eurygaster intergriceps, Eurygaster maura*), *Oebalus* spp. (e.g. *Oebalus mexicana, Oebalus poecilus, Oebalus pugnase, Scotinophara* spp. (e.g. *Scotinophara lurida, Scotinophara coarctata*). Preferred targets include *Antestiopsis orbitalus, Dichelops furcatus, Dichelops melacanthus, Euchistus heros, Euschistus servus, Nezara viridula, Nezara hilare, Piezodorus guildinii, Halyomorpha halys*. In one embodiment the stinkbug target is *Nezara viridula, Piezodorus* spp., *Acrosternum* spp, *Euchistus heros*. The compounds of the invention are particularly effective against *Euschistus* and in particular *Euchistus heros. Euschistus* and in particular *Euchistus heros* are the preferred targets.

In order to apply a compounds of the invention as an insecticide, acaricide, nematicide or molluscicide to a pest, a locus of pest, or to a plant susceptible to attack by a pest, compounds of the invention is usually formulated into a composition which includes, in addition to the compound of the invention, a suitable inert diluent or carrier and, optionally, a surface active agent (SFA). SFAs are chemicals which are able to modify the properties of an interface (for example, liquid/solid, liquid/air or liquid/liquid interfaces) by lowering the interfacial tension and thereby leading to changes in other properties (for example dispersion, emulsification and wetting). It is preferred that all compositions (both solid and liquid formulations) comprise, by weight, 0.0001 to 95%, more preferably 1 to 85%, for example 5 to 60%, of a compound of the invention. The composition is generally used for the control of pests such that a compound of the invention is applied at a rate of from 0.1 g to 10 kg per hectare, preferably from 1 g to 6 kg per hectare, more preferably from 1 g to 1 kg per hectare.

When used in a seed dressing, a compound of the invention is used at a rate of 0.0001 g to 10 g (for example 0.001 g or 0.05 g), preferably 0.005 g to 10 g, more preferably 0.005 g to 4 g, per kilogram of seed.

Compositions comprising a compound of the invention can be chosen from a number of formulation types, including dustable powders (DP), soluble powders (SP), water soluble granules (SG), water dispersible granules (WG), wettable powders (WP), granules (GR) (slow or fast release), soluble concentrates (SL), oil miscible liquids (OL), ultra low volume liquids (UL), emulsifiable concentrates (EC), dispersible concentrates (DC), emulsions (both oil in water (EW) and water in oil (EO)), micro-emulsions (ME), suspension concentrates (SC), aerosols, fogging/smoke formulations, capsule suspensions (CS) and seed treatment formulations. The formulation type chosen in any instance will depend upon the particular purpose envisaged and the physical, chemical and biological properties of the compound of the invention.

Dustable powders (DP) may be prepared by mixing a compound of the invention with one or more solid diluents (for example natural clays, kaolin, pyrophyllite, bentonite, alumina, montmorillonite, kieselguhr, chalk, diatomaceous earths, calcium phosphates, calcium and magnesium carbonates, sulfur, lime, flours, talc and other organic and inorganic solid carriers) and mechanically grinding the mixture to a fine powder.

Soluble powders (SP) may be prepared by mixing a compound of the invention with one or more water-soluble inorganic salts (such as sodium bicarbonate, sodium carbonate or magnesium sulfate) or one or more water-soluble organic solids (such as a polysaccharide) and, optionally, one or more wetting agents, one or more dispersing agents or a mixture of said agents to improve water dispersibility/solubility. The mixture is then ground to a fine powder. Similar compositions may also be granulated to form water soluble granules (SG).

Wettable powders (WP) may be prepared by mixing a compound of the invention with one or more solid diluents or carriers, one or more wetting agents and, preferably, one or more dispersing agents and, optionally, one or more suspending agents to facilitate the dispersion in liquids. The mixture is then ground to a fine powder. Similar compositions may also be granulated to form water dispersible granules (WG).

Granules (GR) may be formed either by granulating a mixture of a compound of the invention and one or more powdered solid diluents or carriers, or from pre-formed blank granules by absorbing a compound of the invention (or a solution thereof, in a suitable agent) in a porous granular material (such as pumice, attapulgite clays, fuller's earth, kieselguhr, diatomaceous earths or ground corn cobs) or by adsorbing a compound of the invention (or a solution thereof, in a suitable agent) on to a hard core material (such as sands, silicates, mineral carbonates, sulfates or phosphates) and drying if necessary. Agents which are commonly used to aid absorption or adsorption include solvents (such as aliphatic and aromatic petroleum solvents, alcohols, ethers, ketones and esters) and sticking agents (such as polyvinyl acetates, polyvinyl alcohols, dextrins, sugars and vegetable oils). One or more other additives may also be included in granules (for example an emulsifying agent, wetting agent or dispersing agent).

Dispersible Concentrates (DC) may be prepared by dissolving a compound of the invention in water or an organic solvent, such as a ketone, alcohol or glycol ether. These solutions may contain a surface active agent (for example to improve water dilution or prevent crystallization in a spray tank).

Emulsifiable concentrates (EC) or oil-in-water emulsions (EW) may be prepared by dissolving a compound of the invention in an organic solvent (optionally containing one or more wetting agents, one or more emulsifying agents or a mixture of said agents). Suitable organic solvents for use in ECs include aromatic hydrocarbons (such as alkylbenzenes or alkylnaphthalenes, exemplified by SOLVESSO 100, SOLVESSO 150 and SOLVESSO 200; SOLVESSO is a Registered Trade Mark), ketones (such as cyclohexanone or methylcyclohexanone) and alcohols (such as benzyl alcohol, furfuryl alcohol or butanol), N-alkylpyrrolidones (such as N-methylpyrrolidone or N-octylpyrrolidone), dimethyl amides of fatty acids (such as $C_8$-$C_{10}$ fatty acid dimethylamide) and chlorinated hydrocarbons. An EC product may spontaneously emulsify on addition to water, to produce an emulsion with sufficient stability to allow spray application through appropriate equipment. Preparation of an EW involves obtaining a compound of the invention either as a liquid (if it is not a liquid at room temperature, it may be melted at a reasonable temperature, typically below 70° C.) or in solution (by dissolving it in an appropriate solvent) and then emulsifiying the resultant liquid or solution into water containing one or more SFAs, under high shear, to produce an emulsion. Suitable solvents for use in EWs include vegetable oils, chlorinated hydrocarbons (such as chlorobenzenes), aromatic solvents (such as alkylbenzenes or alkylnaphthalenes) and other appropriate organic solvents which have a low solubility in water.

Microemulsions (ME) may be prepared by mixing water with a blend of one or more solvents with one or more SFAs, to produce spontaneously a thermodynamically stable isotropic liquid formulation. A compound of the invention is present initially in either the water or the solvent/SFA blend. Suitable solvents for use in MEs include those hereinbefore described for use in ECs or in EWs. An ME may be either an oil-in-water or a water-in-oil system (which system is present may be determined by conductivity measurements) and may be suitable for mixing water-soluble and oil-soluble pesticides in the same formulation. An ME is suitable for dilution into water, either remaining as a microemulsion or forming a conventional oil-in-water emulsion.

Suspension concentrates (SC) may comprise aqueous or non-aqueous suspensions of finely divided insoluble solid particles of a compound of the invention. SCs may be prepared by ball or bead milling the solid compound of the invention in a suitable medium, optionally with one or more dispersing agents, to produce a fine particle suspension of the compound. One or more wetting agents may be included in the composition and a suspending agent may be included to reduce the rate at which the particles settle. Alternatively, a compound of the invention may be dry milled and added to water, containing agents hereinbefore described, to produce the desired end product.

Aerosol formulations comprise a compound of the invention and a suitable propellant (for example n-butane). A compound of the invention may also be dissolved or dispersed in a suitable medium (for example water or a water miscible liquid, such as n-propanol) to provide compositions for use in non-pressurized, hand-actuated spray pumps.

A compound of the invention may be mixed in the dry state with a pyrotechnic mixture to form a composition suitable for generating, in an enclosed space, a smoke containing the compound.

Capsule suspensions (CS) may be prepared in a manner similar to the preparation of EW formulations but with an additional polymerization stage such that an aqueous dispersion of oil droplets is obtained, in which each oil droplet is encapsulated by a polymeric shell and contains a compound of the invention and, optionally, a carrier or diluent therefor. The polymeric shell may be produced by either an interfacial polycondensation reaction or by a coacervation procedure. The compositions may provide for controlled release of the compound of the invention and they may be used for seed treatment. A compound of the invention may also be formulated in a biodegradable polymeric matrix to provide a slow, controlled release of the compound.

A composition may include one or more additives to improve the biological performance of the composition (for example by improving wetting, retention or distribution on surfaces; resistance to rain on treated surfaces; or uptake or mobility of a compound of the invention). Such additives include surface active agents, spray additives based on oils, for example certain mineral oils or natural plant oils (such as soy bean and rape seed oil), and blends of these with other bio-enhancing adjuvants (ingredients which may aid or modify the action of a compound of the invention).

A compound of the invention may also be formulated for use as a seed treatment, for example as a powder composition, including a powder for dry seed treatment (DS), a water soluble powder (SS) or a water dispersible powder for slurry treatment (WS), or as a liquid composition, including a flowable concentrate (FS), a solution (LS) or a capsule suspension (CS). The preparations of DS, SS, WS, FS and LS compositions are very similar to those of, respectively, DP, SP, WP, SC and DC compositions described above. Compositions for treating seed may include an agent for assisting the adhesion of the composition to the seed (for example a mineral oil or a film-forming barrier).

Wetting agents, dispersing agents and emulsifying agents may be surface SFAs of the cationic, anionic, amphoteric or non-ionic type.

Suitable SFAs of the cationic type include quaternary ammonium compounds (for example cetyltrimethyl ammonium bromide), imidazolines and amine salts.

Suitable anionic SFAs include alkali metals salts of fatty acids, salts of aliphatic monoesters of sulfuric acid (for example sodium lauryl sulfate), salts of sulfonated aromatic compounds (for example sodium dodecylbenzenesulfonate, calcium dodecylbenzenesulfonate, butylnaphthalene sulfonate and mixtures of sodium di-isopropyl- and tri-isopropyl-naphthalene sulfonates), ether sulfates, alcohol ether sulfates (for example sodium laureth-3-sulfate), ether carboxylates (for example sodium laureth-3-carboxylate), phosphate esters (products from the reaction between one or more fatty alcohols and phosphoric acid (predominately mono-esters) or phosphorus pentoxide (predominately di-esters), for example the reaction between lauryl alcohol and tetraphosphoric acid; additionally these products may be ethoxylated), sulfosuccinamates, paraffin or olefine sulfonates, taurates and lignosulfonates.

Suitable SFAs of the amphoteric type include betaines, propionates and glycinates.

Suitable SFAs of the non-ionic type include condensation products of alkylene oxides, such as ethylene oxide, propylene oxide, butylene oxide or mixtures thereof, with fatty alcohols (such as oleyl alcohol or cetyl alcohol) or with alkylphenols (such as octylphenol, nonylphenol or octylcresol); partial esters derived from long chain fatty acids or hexitol anhydrides; condensation products of said partial esters with ethylene oxide; block polymers (comprising ethylene oxide and propylene oxide); alkanolamides; simple esters (for example fatty acid polyethylene glycol esters); amine oxides (for example lauryl dimethyl amine oxide); and lecithins.

Suitable suspending agents include hydrophilic colloids (such as polysaccharides, polyvinylpyrrolidone or sodium carboxymethylcellulose) and swelling clays (such as bentonite or attapulgite).

A compound of the invention may be applied by any of the known means of applying pesticidal compounds. For example, it may be applied, formulated or unformulated, to the pests or to a locus of the pests (such as a habitat of the pests, or a growing plant liable to infestation by the pests) or to any part of the plant, including the foliage, stems, branches or roots, to the seed before it is planted or to other media in which plants are growing or are to be planted (such as soil surrounding the roots, the soil generally, paddy water or hydroponic culture systems), directly or it may be sprayed on, dusted on, applied by dipping, applied as a cream or paste formulation, applied as a vapor or applied through distribution or incorporation of a composition (such as a granular composition or a composition packed in a water-soluble bag) in soil or an aqueous environment.

A compound of the invention may also be injected into plants or sprayed onto vegetation using electrodynamic spraying techniques or other low volume methods, or applied by land or aerial irrigation systems.

Compositions for use as aqueous preparations (aqueous solutions or dispersions) are generally supplied in the form of a concentrate containing a high proportion of the active ingredient, the concentrate being added to water before use. These concentrates, which may include DCs, SCs, ECs, EWs, MEs, SGs, SPs, WPs, WGs and CSs, are often required to withstand storage for prolonged periods and, after such storage, to be capable of addition to water to form aqueous preparations which remain homogeneous for a sufficient time to enable them to be applied by conventional spray equipment. Such aqueous preparations may contain varying amounts of a compound of the invention (for example 0.0001 to 10%, by weight) depending upon the purpose for which they are to be used.

A compound of the invention may be used in mixtures with fertilizers (for example nitrogen-, potassium- or phosphorus-containing fertilizers). Suitable formulation types include granules of fertilizer. The mixtures preferably contain up to 25% by weight of the compound of the invention.

The invention therefore also provides a fertilizer composition comprising a fertilizer and a compound of the invention.

The compositions of this invention may contain other compounds having biological activity, for example micronutrients or compounds having fungicidal activity or which possess plant growth regulating, herbicidal, insecticidal, nematicidal or acaricidal activity.

The compound of the invention may be the sole active ingredient of the composition or it may be admixed with one or more additional active ingredients such as a pesticide, fungicide, synergist, herbicide or plant growth regulator where appropriate. An additional active ingredient may: provide a composition having a broader spectrum of activity or increased persistence at a locus; synergize the activity or complement the activity (for example by increasing the speed of effect or overcoming repellency) of the compound of the invention; or help to overcome or prevent the development of resistance to individual components. The particular additional active ingredient will depend upon the intended utility of the composition. Examples of suitable pesticides include the following:

a) Pyrethroids, such as permethrin, cypermethrin, fenvalerate, esfenvalerate, deltamethrin, cyhalothrin (in particular lambda-cyhalothrin and gamma cyhalothrin), bifenthrin, fenpropathrin, cyfluthrin, tefluthrin, fish safe pyrethroids (for example ethofenprox), natural pyrethrin, tetramethrin, S-bioallethrin, fenfluthrin, prallethrin, acrinathirin, etofenprox or 5-benzyl-3-furylmethyl-(E)-(1R,3S)-2,2-dimethyl-3-(2-oxothiolan-3-ylidenemethyl)cyclopropane carboxylate;

b) Organophosphates, such as profenofos, sulprofos, acephate, methyl parathion, azinphos-methyl, demeton-s-methyl, heptenophos, thiometon, fenamiphos, monocrotophos, profenofos, triazophos, methamidophos, dimethoate, phosphamidon, malathion, chlorpyrifos, phosalone, terbufos, fensulfothion, fonofos, phorate, phoxim, pirimiphos-methyl, pirimiphos-ethyl, fenitrothion, fosthiazate or diazinon;

c) Carbamates (including aryl carbamates), such as pirimicarb, triazamate, cloethocarb, carbofuran, furathiocarb, ethiofencarb, aldicarb, thiofurox, carbosulfan, bendiocarb, fenobucarb, propoxur, methomyl or oxamyl;

d) Benzoyl ureas, such as diflubenzuron, triflumuron, hexaflumuron, flufenoxuron, diafenthiuron, lufeneron, novaluron, noviflumuron or chlorfluazuron;

e) Organic tin compounds, such as cyhexatin, fenbutatin oxide or azocyclotin;

f) Pyrazoles, such as tebufenpyrad, tolfenpyrad, ethiprole, pyriprole, fipronil, and fenpyroximate;

g) Macrolides, such as avermectins or milbemycin, for example abamectin, emamectin benzoate, ivermectin, milbemycin, spinosad, azadirachtin, milbemectin, lepimectin or spinetoram;

h) Hormones or pheromones;

i) Organochlorine compounds, such as endosulfan (in particular alpha-endosulfan), benzene hexachloride, DDT, chlordane or dieldrin;

j) Amidines, such as chlordimeform or amitraz;

k) Fumigant agents, such as chloropicrin, dichloropropane, methyl bromide or metam;

l) Neonicotinoid compounds, such as imidacloprid, thiacloprid, acetamiprid, nitenpyram, dinotefuran, thiamethoxam, clothianidin, or nithiazine;

m) Diacylhydrazines, such as tebufenozide, chromafenozide or methoxyfenozide;

n) Diphenyl ethers, such as diofenolan or pyriproxifen;

o) Ureas such as Indoxacarb or metaflumizone;

p) Ketoenols, such as Spirotetramat, spirodiclofen or spiromesifen;

q) Diamides, such as flubendiamide, chlorantraniliprole (Rynaxypyr®) or cyantraniliprole;

r) Essential oils such as Bugoil®—(PlantImpact); or s) a compound selected from buprofezine, flonicamid, acequinocyl, bifenazate, cyenopyrafen, cyflumetofen, etoxazole, flometoquin, fluacrypyrim, fluensulfone, flufenerim, flupyradifuone, harpin, iodomethane, dodecadienol, pyridaben, pyridalyl, pyrimidifen, flupyradifurone, 4-[(6-Chloro-pyridin-3-ylmethyl)-(2,2-difluoro-ethyl)-amino]-5H-furan-2-one (DE 102006015467), CAS: 915972-17-7 (WO 2006129714; WO 2011/147953; WO 2011/147952), CAS: 26914-55-8 (WO 2007/020986), chlorfenapyr, pymetrozine, sulfoxaflor and pyrifluquinazon.

In addition to the major chemical classes of pesticide listed above, other pesticides having particular targets may be employed in the composition, if appropriate for the intended utility of the composition. For instance, selective insecticides for particular crops, for example stemborer specific insecticides (such as cartap) or hopper specific insecticides (such as buprofezin) for use in rice may be employed. Alternatively insecticides or acaricides specific for particular insect species/stages may also be included in the compositions (for example acaricidal ovo-larvicides, such as clofentezine, flubenzimine, hexythiazox or tetradifon; acaricidal motilicides, such as dicofol or propargite;

acaricides, such as bromopropylate or chlorobenzilate; or growth regulators, such as hydramethylnon, cyromazine, methoprene, chlorfluazuron or diflubenzuron).

Examples of fungicidal compounds which may be included in the composition of the invention are (E)-N-methyl-2-[2-(2,5-dimethylphenoxymethyl)phenyl]-2-methoxy-iminoacetamide (SSF-129), 4-bromo-2-cyano-N,N-dimethyl-6-trifluoromethylbenzimidazole-1-sulfonamide, α-[N-(3-chloro-2,6-xylyl)-2-methoxyacetamido]-γ-butyrolactone, 4-chloro-2-cyano-N,N-dimethyl-5-p-tolylimidazole-1-sulfonamide (IKF-916, cyamidazosulfamid), 3-5-dichloro-N-(3-chloro-1-ethyl-1-methyl-2-oxopropyl)-4-methylbenzamide (RH-7281, zoxamide), N-allyl-4,5,-dimethyl-2-trimethylsilylthiophene-3-carboxamide (MON65500), N-(1-cyano-1,2-dimethylpropyl)-2-(2,4-dichlorophenoxy)propionamide (AC382042), N-(2-methoxy-5-pyridyl)-cyclopropane carboxamide, acibenzolar (CGA245704), alanycarb, aldimorph, anilazine, azaconazole, azoxystrobin, benalaxyl, benomyl, biloxazol, bitertanol, blasticidin S, bromuconazole, bupirimate, captafol, captan, carbendazim, carbendazim chlorhydrate, carboxin, carpropamid, carvone, CGA41396, CGA41397, chinomethionate, chlorothalonil, chlorozolinate, clozylacon, copper containing compounds such as copper oxychloride, copper oxyquinolate, copper sulfate, copper tallate and Bordeaux mixture, cymoxanil, cyproconazole, cyprodinil, debacarb, di-2-pyridyl disulfide 1,1'-dioxide, dichlofluanid, diclomezine, dicloran, diethofencarb, difenoconazole, difenzoquat, diflumetorim, O,O-di-iso-propyl-S-benzyl thiophosphate, dimefluazole, dimetconazole, dimethomorph, dimethirimol, diniconazole, dinocap, dithianon, dodecyl dimethyl ammonium chloride, dodemorph, dodine, doguadine, edifenphos, epoxiconazole, ethirimol, ethyl-(Z)—N-benzyl-N-([methyl(methyl-thioethylideneaminooxycarbonyl)amino]thio)-β-alaninate, etridiazole, famoxadone, fenamidone (RPA407213), fenarimol, fenbuconazole, fenfuram, fenhexamid (KBR2738), fenpiclonil, fenpropidin, fenpropimorph, fentin acetate, fentin hydroxide, ferbam, ferimzone, fluazinam, fludioxonil, flumetover, fluoroimide, fluquinconazole, flusilazole, flutolanil, flutriafol, folpet, fuberidazole, furalaxyl, furametpyr, guazatine, hexaconazole, hydroxyisoxazole, hymexazole, imazalil, imibenconazole, iminoctadine, iminoctadine triacetate, ipconazole, iprobenfos, iprodione, iprovalicarb (SZX0722), isopropanyl butyl carbamate, isoprothiolane, kasugamycin, kresoxim-methyl, LY186054, LY211795, LY248908, mancozeb, maneb, mefenoxam, mepanipyrim, mepronil, metalaxyl, metconazole, metiram, metiram-zinc, metominostrobin, myclobutanil, neoasozin, nickel dimethyldithiocarbamate, nitrothal-isopropyl, nuarimol, ofurace, organomercury compounds, oxadixyl, oxasulfuron, oxolinic acid, oxpoconazole, oxycarboxin, pefurazoate, penconazole, pencycuron, phenazin oxide, phosetyl-Al, phosphorus acids, phthalide, picoxystrobin (ZA1963), poly-oxin D, polyram, probenazole, prochloraz, procymidone, propamocarb, propiconazole, propineb, propionic acid, pyrazophos, pyrifenox, pyrimethanil, pyroquilon, pyroxyfur, pyrrolnitrin, quaternary ammonium compounds, quinomethionate, quinoxyfen, quintozene, sipconazole (F-155), sodium pentachlorophenate, spiroxamine, streptomycin, sulfur, tebuconazole, tecloftalam, tecnazene, tetraconazole, thiabendazole, thifluzamid, 2-(thiocyanomethylthio)benzothiazole, thiophanate-methyl, thiram, timibenconazole, tolclofos-methyl, tolylfluanid, triadimefon, triadimenol, triazbutil, triazoxide, tricyclazole, tridemorph, trifloxystrobin (CGA279202), triforine, triflumizole, triticonazole, validamycin A, vapam, vinclozolin, zineb, ziram; N-[9-(dichloromethylene)-1,2,3, 4-tetrahydro-1,4-methanonaphthalen-5-yl]-3-(difluoromethyl)-1-methyl-1H-pyrazole-4-carboxamide[1072957-71-1], 1-methyl-3-difluoromethyl-1H-pyrazole-4-carboxylic acid (2-dichloromethylene-3-ethyl-1-methyl-indan-4-yl)-amide, and 1-methyl-3-difluoromethyl-4H-pyrazole-4-carboxylic acid [2-(2,4-dichloro-phenyl)-2-methoxy-1-methyl-ethyl]-amide.

Preferred additional pesticidally active ingredients are those selected from neonicotinoids, pyrethroids, strobilurins, triazoles and carboxamides (SDHI inhibitors). Pyrethroids are of interest of which lambda-cyhalothrin is of particular interest. Combinations of compounds of the invention and pyrethroids, in parrticular lambda-cyhalothrin, exhibit synergistic control of stinkbugs (according to the Colby formula), in particular *Euschistus*, e.g. *Euschistus heros*.

In a further aspect of the invention there is provided a method comprising applying to a crop of soybean plants, the locus thereof, or propagation material thereof, a combination of a compound a compound of the invention and lambda cyhalothrin in a synergistically effective amount, wherein the method is for control and/or prevention of stinkbugs, preferably *Euschistus*, e.g. *Euschistus heros*.

The compounds of the invention may be mixed with soil, peat or other rooting media for the protection of plants against seed-borne, soil-borne or foliar fungal diseases.

Examples of suitable synergists for use in the compositions include piperonyl butoxide, sesamex, safroxan and dodecyl imidazole.

Suitable herbicides and plant-growth regulators for inclusion in the compositions will depend upon the intended target and the effect required.

An example of a rice selective herbicide which may be included is propanil. An example of a plant growth regulator for use in cotton is PIX™.

Some mixtures may comprise active ingredients which have significantly different physical, chemical or biological properties such that they do not easily lend themselves to the same conventional formulation type. In these circumstances other formulation types may be prepared. For example, where one active ingredient is a water insoluble solid and the other a water insoluble liquid, it may nevertheless be possible to disperse each active ingredient in the same continuous aqueous phase by dispersing the solid active ingredient as a suspension (using a preparation analogous to that of an SC) but dispersing the liquid active ingredient as an emulsion (using a preparation analogous to that of an EW). The resultant composition is a suspoemulsion (SE) formulation.

Unless otherwise stated the weight ratio of the compound of I with an additional active ingredient may generally be between 1000:1 and 1:1000. In other embodiments that weight ratio of A to B may be between 500:1 to 1:500, for example between 100:1 to 1:100, for example between 1:50 to 50:1, for example 1:20 to 20:1, for example 1:10 to 10:1, for example 1:5 to 5:1, for example 1:1.

Compositions of the invention include those prepared by premixing prior to application, e.g. as a readymix or tank-mix, or by simultaneous application or sequential application to the plant.

The invention will now be illustrated by the following non-limiting Examples. All citations are incorporated by reference.

BIOLOGICAL EXAMPLES

TABLE A

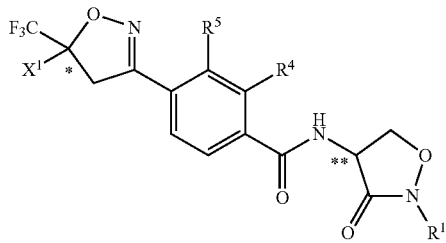

(Ia)

| | X1 | R1 | R4 | R5 | Stereo-chemistry at * | Stereo-chemistry at ** |
|---|---|---|---|---|---|---|
| A1 | 3,4,5-trichlorophenyl | ethyl | Cl | H | S | R |
| A2 | 3,5-dichlorophenyl | ethyl | Br | H | S | R |
| A3 | 3,4,5-trichlorophenyl | ethyl | Br | H | S | R |
| A4 | 3,5-dichlorophenyl | ethyl | CF3 | H | S | R |
| A5 | 3,4,5-trichlorophenyl | ethyl | CF3 | H | S | R |
| A6 | 3-trifluoromethylphenyl | ethyl | CH3 | H | S | R |
| A7 | 3,4,5-trichlorophenyl | ethyl | CF3 | H | S | R |
| A8 | 3,5-dichlorophenyl | ethyl | CF3 | H | S | R |
| A9 | 3,5-dichlorophenyl | ethyl | Br | H | S | R |
| A10 | 3-chloro,5-trifluoromethylphenyl | ethyl | CH=CH—CH=CH | S | R |
| A11 | 3,5-dichloro-4-fluorophenyl | ethyl | Cl | H | S | R |
| A12 | 3,5-dichloro-4-fluorophenyl | ethyl | CH3 | H | S | R |
| A13 | 3,4,5-trichlorophenyl | 2,2,2-trifluoroethyl | CH3 | H | S | R |
| A14 | 3,4,5-trichlorophenyl | 2,2,2-trifluoroethyl | CH3 | H | S | R/S |
| A15 | 3,5-dichlorophenyl | methyl | CH3 | H | S | R/S |
| A16 | 3,5-dichlorophenyl | 2,2,2-trifluoroethyl | CH3 | H | S | S |
| A17 | 3,5-dichlorophenyl | ethyl | CH3 | H | S | S |
| A18 | 3,5-dichloro-4-fluorophenyl | Ethyl | CH3 | H | S | R/S |
| A19 | 3,5-dichlorophenyl | 2,2-difluoroethyl | CH3 | H | S | R/S |
| A20 | 3,5-dichlorophenyl | 2,2,2-trifluoroethyl | CH3 | H | S | R/S |
| A21 | 3,5-dichlorophenyl | ethyl | CH3 | H | S | R/S |
| A22 | 3-chloro-5-bromophenyl | 2,2,2-trifluoroethyl | CH3 | H | R/S | R |
| A23 | 3-chloro-5-bromophenyl | ethyl | CH3 | H | R/S | R |
| A24 | 3-chloro-5-trifluoromethylphenyl | ethyl | CH3 | H | R/S | R |
| A25 | 3,5-dichlorophenyl | 2,2-difluoroethyl | CH3 | H | S | R |
| A26 | 3,5-trifluoromethyl-4-chlorophenyl | ethyl | CH3 | H | R/S | R |
| A27 | 3,5-dichlorophenyl | 2,2,2-trifluoroethyl | CH3 | H | S | R |
| A28 | 3,5-dichlorophenyl | ethyl | CH3 | H | S | R |

R/S indicates a racemic mixture.

Table A provides compounds of formula (Ia) wherein $X^1$, $R^1$, $R^4$ and $R^5$ have the definitions shown below.

TABLE B

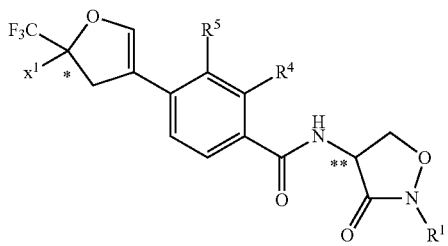

(Ib)

| | X1 | R1 | R4 | R5 | Stereo-chemistry at * | Stereo-chemistry at ** |
|---|---|---|---|---|---|---|
| B1 | 3,5-dichlorophenyl | ethyl | CH3 | H | R/S | R |

Table B provides compounds of formula (Ia) wherein $X^1$, $R^1$, $R^4$ and $R^5$ have the definitions shown below.

*Euschistus heros* (Neotropical brown stink bug) (contact/feeding activity)

2 week old soybean plants are sprayed in a turn table spray chamber with the diluted spray solutions. After drying, 2 soybean seeds are added and plants are infested with 10 N-2 nymphs of the neotropical brown stink bug *Euschistus heros* in plastic test boxes. Boxes are incubated in a climate chamber at 25° C. and 60% RH. Evaluation is done 5 days after infestation on mortality and growth effects.

The following compounds showed at least 80% control at 50 ppm:

A1, A2, A3, A4, A5, A6, A7, A8, A9, A10, A11, A12, A13, A14, A15, A16, A17, A18, A19, A20, A21, A22, A23, A24, A25, A26, A27, A28, B1

The compounds enriched for the R stereochemistry at ** gave superior performance at low application rates.

COMPARATIVE EXAMPLE

Compounds are tested according to the above method. The results show that the compounds of the invention are significantly more active against *Euschistus heros* than structurally similar compounds, particularly at low rates of application.

Compound of the invention

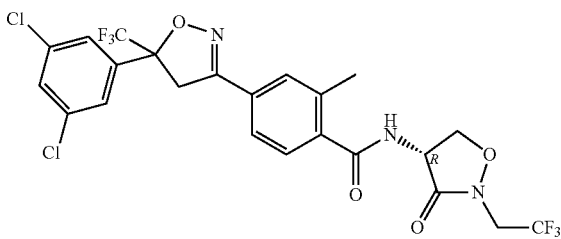

Reference compound

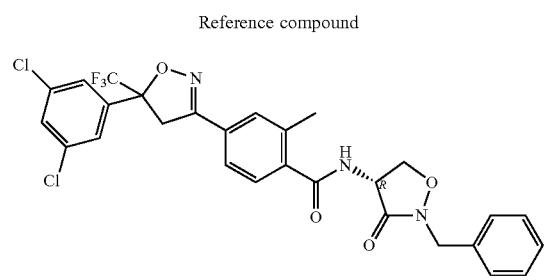

| Compound | Test | Application rate/ppm | Control/% |
|---|---|---|---|
| Compound of the invention | *Euschistus heros* (Neotropical brown stink bug) | 12.5 | 100 |
| | | 3 | 85 |
| | | 0.8 | 15 |
| Reference compound | *Euschistus heros* (Neotropical brown stink bug) | 12.5 | 90 |
| | | 3 | 35 |
| | | 0.8 | 0 |

The compound of the invention and reference compound are compounds B5 and B4 respectively from WO 2011/067272.

REFERENCES

Corrêa-Perreira, B. S.; Panizzi, A. R., Percevejos da soja e seu manejo, Londrina: Embrapa-CNPSo, 1999, 45 (Circular Técnica, 24).

Galileo, M. H. M., Heinrichs E. A., Retenção foliar em plantas de soja (*glycine max* (l.) merrill) resultantes da ação *Piezodorus guildinii* (Westwood, 1837) (Hemiptera pentatomidae), em diferentes níveis e épocas de infestação. An. Soc. Entomol. Brasil, 1978, 7, 85-98.

Panizzi, A. R., Slansky junior, F. Review of phytophagous pentatomids (Hemiptera pentatomidae) associated with soybean in the Americas, Florida Entomologist, Gainesville, 1985, 68(1), 184-214.

Schmidt, F. G. V., Pires, C. S. S., Sujii, E. R., Borges, M., Pantaleão, D. C., Lacerda, A. L., Azevedo, C. R., Comportamento e captura das fêmeas de *Euschistus heros* em armadilhas iscadas com feromonio sexual, 2003, Comunicado Técnico 93. Brasilia, D F.

Sosa-Gomez, D. R., Silva, J. Da., Lopes, I. O. N., Corso, I., Almeida, A. M. R. Almeida, morass, g. c.p.m.; baur, m. insecticide susceptibility of *Euschistus heros* (Heteroptera pentatomidae) in Brazil, Journal of Economic Entomology, 2009, 102(3), 1209-1216.

Todd, J. W., Herzog, D. C., Sampling phytophagous pentatomidae on soybean. in: Kogan, M., Herzog, D. C. (ed.). Sampling methods in soybean entomology, New York: Springer, 1980, 438-478.

The invention claimed is:

1. A method of controlling infestation of stinkbugs in soybeans, the method comprising applying to a crop of soybean plants, the locus thereof, or propagation material thereof, a compound of formula (I)

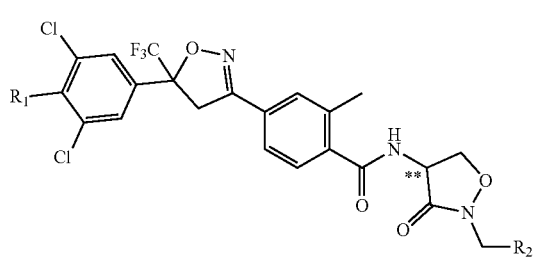

(I)

wherein R₁ is H and R₂ is CF₃ or R₁ is F and R₂ is CH₃, and ** is a chiral center.

2. The method of claim 1, wherein the stinkbugs are Euschitus heros.

3. The method of claim 1, wherein the compound of formula (I) controls at least 80% of the stinkbugs at 50 ppm.

4. The method of claim 1, wherein ** is R

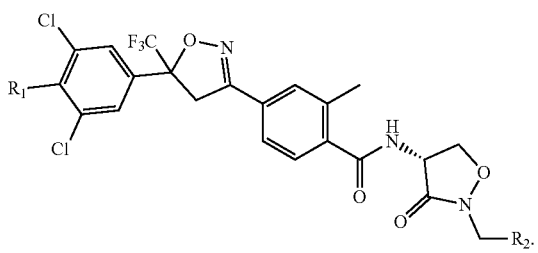

(Ia)

5. The method of claim 1, further comprising applying an attractant with the compound of formula (I).

6. The method of claim 1, wherein the compound of formula (I) is applied at a rate of 1-500 g/ha.

7. The method of claim 6, wherein the compound of formula (I) is applied at a rate of 10-70 g/ha.

8. The method of claim 1, wherein the soybean is transgenic.

9. The method of claim 1, wherein applying is done as a seed dressing.

10. The method of claim 1, wherein the compound of formula (I) is mixed with a pyrotechnic mixture.

11. The method of claim 1, applying is injecting into plants.

12. The method of claim 1, wherein the compound of formula (I) is mixed with a fertilizer.

13. The method of claim 1, wherein the compound of formula (I) is mixed with an additional active ingredient.

14. The method of claim 13, wherein the additional active ingredient is a fungicide.

15. The method of claim 1, wherein the compound of formula (I) is formulated as a capsule suspension.

16. The method of claim 1, wherein R₁ is H and R₂ is CF₃.

17. The method of claim 1, wherein R₁ is F and R₂ is CH₃.

18. The method of claim 4, wherein R₁ is H and R₂ is CF₃.

19. The method of claim 4, wherein R₁ is F and R₂ is CH₃.

20. The method of claim 19, wherein the carbon connected to the trifluoromethyl has S stereochemistry.

21. A method of controlling infestation of stinkbugs in soybeans as claimed in claim 1, wherein the applying is applying to a crop of soybean plants, the locus thereof, or propagation material thereof, a compound of:

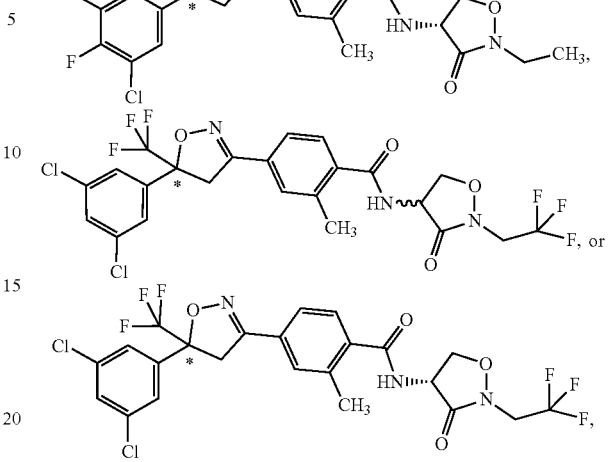

wherein the soybean plants are Bt plants.

22. The method of claim 21, wherein the compound is

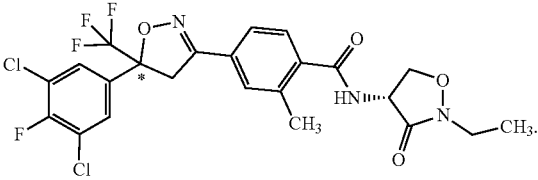 [SMILES: CCN1OC[C@@H](NC(=O)c2ccc(C3=NOC(c4cc(Cl)c(F)c(Cl)c4)(C(F)(F)F)C3)cc2C)C1=O]

23. The method of claim 21, wherein the compound is

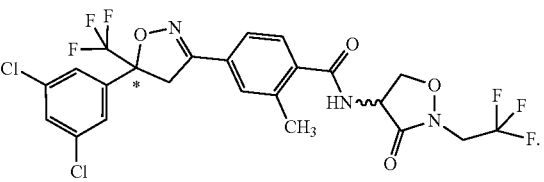 [SMILES: Cc1cc(C2=NOC(c3cc(Cl)cc(Cl)c3)(C(F)(F)F)C2)ccc1C(=O)NC1CON(CC(F)(F)F)C1=O]

24. The method of claim 21, wherein the compound is

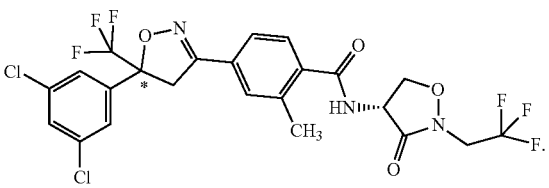 [SMILES: Cc1cc(C2=NOC(c3cc(Cl)cc(Cl)c3)(C(F)(F)F)C2)ccc1C(=O)N[C@@H]1CON(CC(F)(F)F)C1=O]

25. The method of claim 24, wherein the Bt plants comprise at least one gene selected from CrylA(a), CrylA(b), CrylA(c), CryllA, CrylllA, CryIIIB2, Cry9c, Cry2Ab, Cry3Bb and CrylF.

26. The method of claim 25, wherein the at least one gene includes CrylA(a).

27. The method of claim 25, wherein at least one gene includes CrylA(b).

28. The method of claim 25, wherein at least one gene includes CrylA(c).

29. The method of claim 25, wherein at least one gene includes CryIlA.

30. The method of claim 25, wherein at least one gene includes CryIllA.

31. The method of claim 25, wherein at least one gene includes CryIIIB2.

32. The method of claim 25, wherein at least one gene includes Cry9c.

33. The method of claim 25, wherein at least one gene includes Cry2Ab.

34. The method of claim 25, wherein at least one gene includes Cry3Bb.

35. The method of claim 25, wherein at least one gene includes CrylF.

36. The method of claim 21, wherein the pest is a stinkbug Euschistus heron.

37. The method of claim 21, wherein the compound is applied at a rate of 1 g to 1 kg per hectare.

38. The method of claim 21, wherein the applying is to a propagation material.

39. The method of claim 21, wherein the compound is part of a composition selected from dustable powders (DP), soluble powders (SP), water soluble granules (SG), water dispersible granules (WG), wettable powders (WP), granules (GR), soluble concentrates (SL), oil miscible liquids (OL), ultra low volume liquids (UL), emulsifiable concentrates (EC), dispersible concentrates (DC), emulsion of oil in water (EW), emulsion of water in oil (EO), micro-emulsions (ME), suspension concentrates (SC), aerosols, fogging/smoke formulations, capsule suspensions (CS) and seed treatment formulations.

40. The method of claim 21, wherein the applying of the compound is admixed with one or more additional active ingredients.

41. The method of claim 40, wherein the one or more additional active ingredients include at least one of a pyrethroids, an organophosphate, a carbamate, a benzoyl urea, an organic tin compound, a pyrazoles, hormones or pheromones, an organochlorine, an amidine, a fumigant, a neonicotinoid, a diacylhydrazines, a diphenyl ethers, a urea, a ketoenol, a diamides, or an essential oil.

* * * * *